(12) United States Patent
Yao et al.

(10) Patent No.: US 10,168,234 B2
(45) Date of Patent: Jan. 1, 2019

(54) INTELLIGENT TEST DEVICE FOR FLOOR PANELS

(71) Applicant: ZHUHAI SEPSTAR ELECTRONIC CO., LTD., Zhuhai, Guangdong (CN)

(72) Inventors: Zhijie Yao, Guangdong (CN); Hui Tan, Guangdong (CN); Jun Hong, Guangdong (CN)

(73) Assignee: ZHUHAI SEPSTAR ELECTRONIC CO., LTD., Zhuhai (CN)

( * ) Notice: Subject to any disclaimer, the term of this patent is extended or adjusted under 35 U.S.C. 154(b) by 345 days.

(21) Appl. No.: 14/994,179

(22) Filed: Jan. 13, 2016

(65) Prior Publication Data

US 2017/0160146 A1 Jun. 8, 2017

(30) Foreign Application Priority Data

Dec. 4, 2015 (CN) .......................... 2015 1 0888880

(51) Int. Cl.
| | | |
|---|---|---|
| *G01N 3/04* | (2006.01) | |
| *G01L 1/04* | (2006.01) | |
| *G01M 99/00* | (2011.01) | |
| *B07C 5/34* | (2006.01) | |

(52) U.S. Cl.
CPC .................. *G01L 1/04* (2013.01); *B07C 5/34* (2013.01); *G01M 99/00* (2013.01)

(58) Field of Classification Search
CPC .... G01B 7/16; G01B 5/30; G01L 1/04; B07C 5/34
See application file for complete search history.

(56) References Cited

FOREIGN PATENT DOCUMENTS

| CN | 102097237 | * | 6/2011 | ............. H01H 11/00 |
|---|---|---|---|---|
| CN | 203811199 | * | 9/2014 | ............... B07C 5/00 |

* cited by examiner

*Primary Examiner* — Harshad R Patel
*Assistant Examiner* — Nigel Plumb

(57) ABSTRACT

The present invention relates to an intelligent test device for a substrate, comprising a main case, a detection turntable, a feeding mechanism, a contact detection mechanism for testing the OFF-pressure of contacts from spring pieces, a discharging mechanism and an electric control box, the detection turntable, the feeding mechanism, the contact detection mechanism and the discharging mechanism being all ON-connected to the electric control box. The test device of the present invention can complete the OFF-pressure detection of the longitudinal and transverse contacts of the substrate automatically without requiring any manual operation, thus the test device of the present invention is easy to use, and the detection accuracy and the detection efficiency are high. Furthermore, the ex-factory pass rate of products is guaranteed, the cost is reduced and defective substrates can be classified and sorted automatically.

9 Claims, 5 Drawing Sheets

INTELLIGENT TEST DEVICE FOR FLOOR PANELS

CROSS-REFERENCE TO RELATED APPLICATIONS

The present application claims the benefit of Chinese Patent Application No. 201510888880.5 filed on Dec. 4, 2015, the contents of which are hereby incorporated by reference.

TECHNICAL FIELD

The present invention belongs to the technical field of testing substrates, and particularly relates to an intelligent test device for a substrate.

BACKGROUND OF THE PRESENT INVENTION

At present, substrate manufacturers need to perform contact pressure detection before ex-factory of the substrates. The detection is generally performed manually by using existing simple detection equipment. Such a method requires a lot of labor and the detection efficiency is significantly low. Furthermore, it is difficult to guarantee the detection accuracy. As a result, the pass rate of ex-factory products is seriously influenced.

SUMMARY OF THE PRESENT INVENTION

In order to solve the aforementioned technical problems in the prior art, the present invention provides an intelligent test device for a substrate, which can complete the OFF-pressure detection of the longitudinal and transverse contacts of the substrate automatically without requiring any manual operation, allow for easy operation, high detection accuracy and detection efficiency, guaranteed ex-factory pass rate of products and reduced cost, and can automatically classify and sort defective substrates.

The present invention employs the following technical solution to solve the aforementioned technical problems.

An intelligent test device for a substrate is provided, including a main case, a detection turntable, a feeding mechanism, a contact detection mechanism for testing the OFF-pressure of contacts from spring pieces, a discharging mechanism and an electric control box, the detection turntable, the feeding mechanism, the contact detection mechanism and the discharging mechanism being all ON-connected to the electric control box; wherein, the detection turntable is arranged on a workbench within the main case in a rotatable manner, with a driving motor provided on the bottom thereof and a number of grippers provided on the disk thereof; and the driving motor is connected to a rotating shaft of the detection turntable by means of driving, and ON-connected to the electric control box;

the feeding mechanism includes a feeding conveyor belt and a loading manipulator for carrying the substrate to be tested at a discharging end of the feeding conveyor belt to a loading station gripper of the detection turntable; the feeding conveyor belt is arranged outside the main case, and the discharging end thereof extends into the main case; and the loading manipulator is arranged on the workbench within the main case, and located on an outer side of a loading station of the detection turntable;

the contact detection mechanism is arranged on the workbench within the main case, and located on the outer side of a detection station of the detection turntable; and the discharging mechanism includes a discharging conveyor belt and an unloading manipulator for carrying the tested substrate on an unloading station gripper of the detection turntable to a feeding end of the discharging conveyor belt; the discharging conveyor belt is arranged outside the main case, and the feeding end thereof extends into the main case; and the unloading manipulator is arranged on the workbench within the main case, and located on an outer side of an unloading station of the detection turntable.

Further, the contact detection mechanism includes a longitudinal detection mechanism and/or a transverse detection mechanism;

the longitudinal detection mechanism mainly consists of a first base frame, a first test assembly and a first product positioning assembly, wherein the first base frame is mounted on the workbench within the main case; the first test assembly includes a first ball screw, a first pressure sensor and a first pressure thimble, the first ball screw is mounted on the first base frame perpendicularly to the detection turntable, a first sensor holder extending to be above a longitudinal detection station of the detection turntable is provided on a driving slider thereof, and the first pressure sensor is mounted on the first sensor holder; the first pressure thimble is vertically downward arranged on the first pressure sensor and located right above the longitudinal detection station, and moves up and down under the drive of the first ball screw; the first product positioning assembly includes a first driving cylinder and a first product holding jaw, the first driving cylinder is mounted on the first base frame perpendicularly to the detection turntable, the first product holding jaw is mounted on the first base frame in such a way of being capable of moving up and down and is connected to the driving shaft of the first driving cylinder, and a first test probe for powering the substrate to be tested fixed by the first base frame is provided on the first base frame; during the test, the first pressure thimble passes through the first product holding jaw and then acts on the substrate to be tested fixed within the first product holding jaw, so that the longitudinally ON-connected contacts of the substrate to be tested are separated and powered off;

the transverse detection mechanism mainly consists of a second base frame, a second test assembly and a second product positioning assembly, wherein the second base frame is mounted on the workbench within the main case; the second test assembly includes a second ball screw, a second pressure sensor and a second pressure thimble, the second ball screw is horizontally mounted on the second base frame and extends to be above the transverse detection station of the detection turntable, a second sensor holder is provided on a driving slider thereof, and the second pressure sensor is mounted on the second sensor holder; the second pressure thimble is horizontally mounted on the second pressure sensor and located right above the transverse detection station, and moves forth and back under the drive of the second ball screw; the second product positioning assembly is located in front of the second detection assembly and includes a second driving cylinder and a second product holding jaw, the second driving cylinder is mounted on the second base frame perpendicularly to the detection turntable, the second product holding jaw is mounted on the second base frame in such a way of being capable of moving up and down, and is connected to the driving shaft of the second driving cylinder, and a second test probe for powering the substrate to be tested fixed by the second base frame is provided on the second base frame; during the test, the second pressure thimble extends into the second product holding jaw under the drive of the second ball screw and then acts on the substrate to be tested fixed within the second product holding jaw, so that the transversely ON-connected contacts of the substrate to be tested are separated and powered off;

and, the first ball screw, the first pressure sensor, the first driving cylinder, the first product holding jaw, the first test probe, the second ball screw, the second pressure sensor, the second driving cylinder, the second product holding jaw and the second test probe are all ON-connected to the electric control box.

Further, the first product positioning assembly further includes a first linear slide rail and a first slider, and the second product positioning assembly further includes a second linear slide rail and a second slider; the first linear slide rail is vertically downward mounted on the first base frame, the first slider is clamped onto the first linear slide rail in such a way of being capable of moving up and down, and the first product holding jaw is mounted on the first slider; and the second linear slide rail is vertically downward arranged on the second base frame, the second slider is clamped onto the second linear slide rail in such a way of being capable of moving up and down, and the second product holding jaw is mounted on the first slider.

Further, the loading manipulator includes a U-shaped base frame, a first cylinder, a second cylinder, a third cylinder, a fourth cylinder, a third linear slide rail and a third slider; the U-shaped base frame is mounted on the workbench within the main case, and the discharging end of the feeding conveyor belt is located within a U-shaped opening of the U-shaped base frame; the first cylinder and the third linear slide rail are horizontally arranged on the top of the U-shaped base frame in parallel to each other, the third slider is clamped onto the third linear slide rail in such a way of being capable of moving left and right, and the third slider has a longitudinal mounting plate provided thereon; the second cylinder is vertically downward mounted on the longitudinal mounting plate, the third cylinder is vertically downward mounted on the longitudinal mounting plate in such a way of being capable of moving up and down, and is connected to the driving shaft of the second cylinder; the fourth cylinder is vertically downward mounted on a slider of the third cylinder and moves forth and back along with the slider, and the driving shaft thereof has a first gripper jaw provided thereon; and the first cylinder, the second cylinder, the third cylinder and the fourth cylinder are all ON-connected to the electric control box.

Further, the loading manipulator further includes a fourth linear slide rail and a fourth slider, the fourth linear slide rail is vertically downward arranged on the longitudinal mounting plate, and the fourth slider is clamped onto the fourth linear slide rail in such a way of being capable of moving up and down and has the third cylinder arranged thereon.

Further, the unloading manipulator includes a rotary motor, a rotating arm and a fifth cylinder; the rotary motor is mounted on the workbench within the main case, with a rotating shaft thereof vertically facing upward; one end of the rotating arm is mounted on the rotating shaft, the other end thereof has the fifth cylinder arranged thereon, and the driving shaft of the fifth cylinder vertically faces downward and has a second gripper jaw provided thereon; and both the rotary motor and the fifth cylinder are ON-connected to the electric control box.

Further, an automatic sorting mechanism for defective products is provided on the discharging conveyor belt, and the automatic sorting mechanism for defective products includes more than one push-out cylinder and more than one sorting box; the push-out cylinder and the sorting box are arranged, opposite to each other, in a left side and a right side of the discharging conveyor belt; and the push-out cylinder is ON-connected to the electric control box, and extends by the driving shaft thereof into the discharging conveyor belt under the control of the electric control box for pushing the defective products into the sorting box.

Further, the push-out cylinder and the sorting box are respectively arranged on the left side and the right side of the discharging conveyor belt side by side, and arranged opposite to each other one to one.

Further, a sensor is provided on a side, closer to the loading end of the discharging conveyor belt, of the push-out cylinder, and the sensor is ON-connected to the electric control box.

Further, the position sensor is an ultrasonic sensor or an infrared sensor.

The present invention has the following beneficial effects:

With the aforementioned technical solution, the test device of the present invention can complete the OFF-pressure detection of the longitudinal and transverse contacts of the substrate automatically without requiring any manual operation and allow for easy operation; and the detection accuracy and the detection efficiency are significantly improved, so that the ex-factory pass rate of products is guaranteed, both the labor cost and the production cost are effectively reduced, and the market competitiveness of products is further enhanced thus to obtain business success.

Additionally, the automatic sorting mechanism for defective products arranged on the discharging conveyor belt may classify and sort the defective products automatically, the rework sorting process is thus omitted and the rework workload is reduced. Consequently, the rework is easier, and the cost is lower.

BRIEF DESCRIPTION OF THE DRAWINGS

The present invention will be further described as below with reference to the accompanying drawings by a specific embodiment.

DETAILED DESCRIPTION OF THE PRESENT INVENTION

In order to make the objectives, technical solutions and advantages of the present invention clearer, the present invention will be further described below in detail with reference to the accompanying drawings by an embodiment. It should be understood that the specific embodiment to be described herein is merely used to explain the present invention, and not for limiting the present invention.

Figure 1:
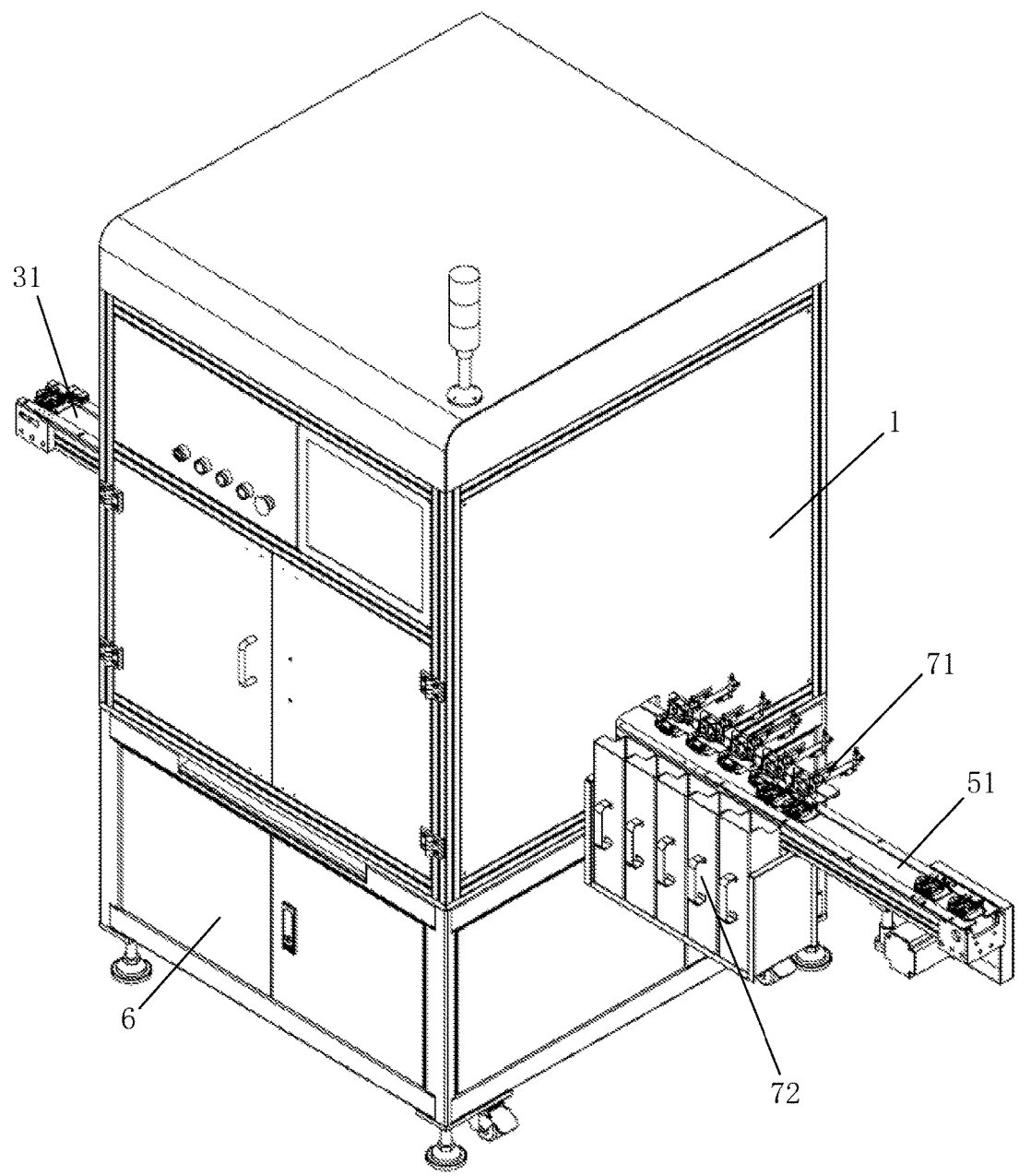
FIG. 1 is a schematic structure diagram of an embodiment of an intelligent test device for a substrate according to the present invention.
Figure 2:
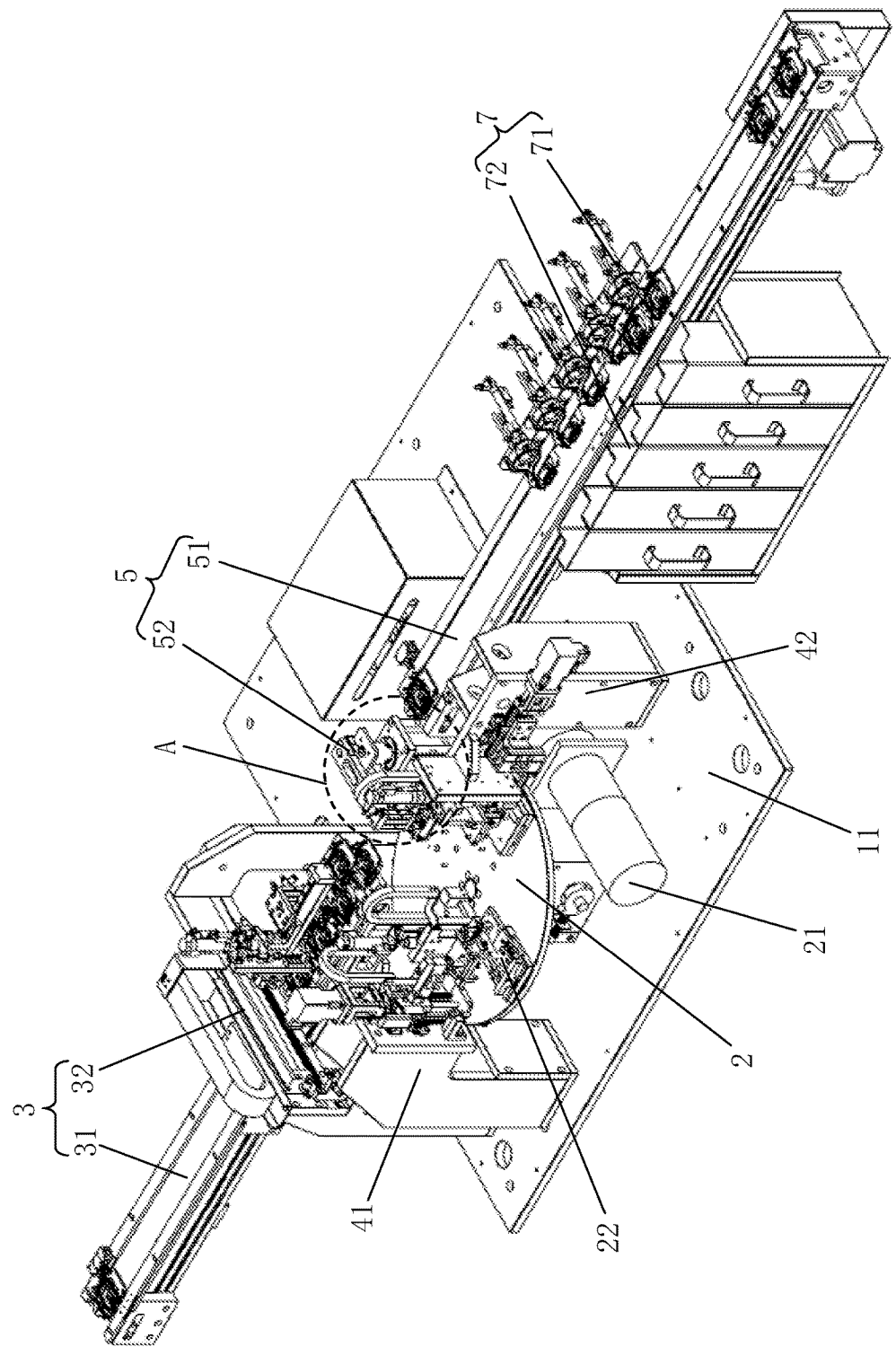
FIG. 2 is a schematic structure diagram of the embodiment of the intelligent test device for a substrate, with a housing of a main case and an electric control box removed, according to the present invention.
Figure 3:
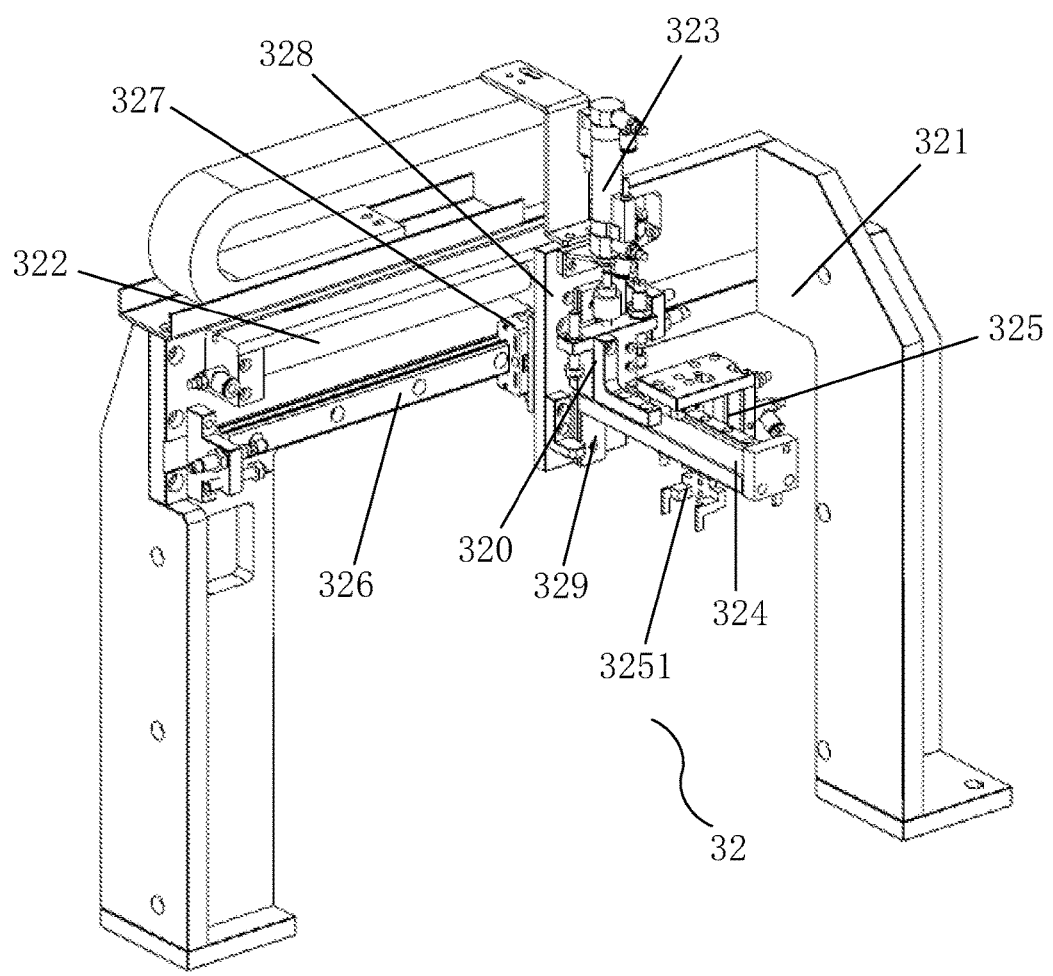
FIG. 3 is a schematic structure diagram of a loading manipulator in the embodiment of the intelligent test device for a substrate according to the present invention.
Figure 4:
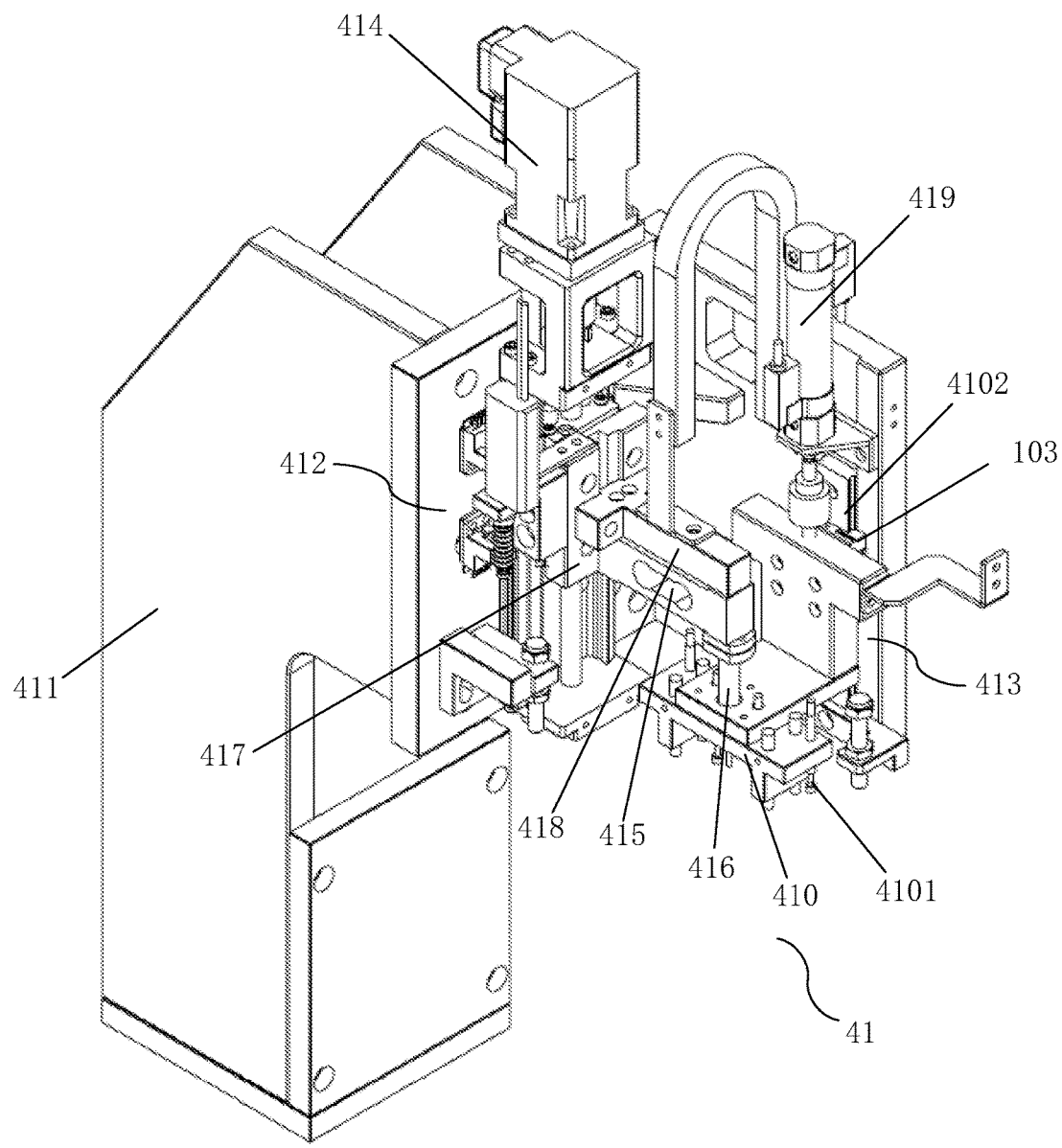
FIG. 4 is a schematic structure diagram of a longitudinal detection mechanism in the embodiment of the intelligent test device for a substrate according to the present invention.
Figure 5:
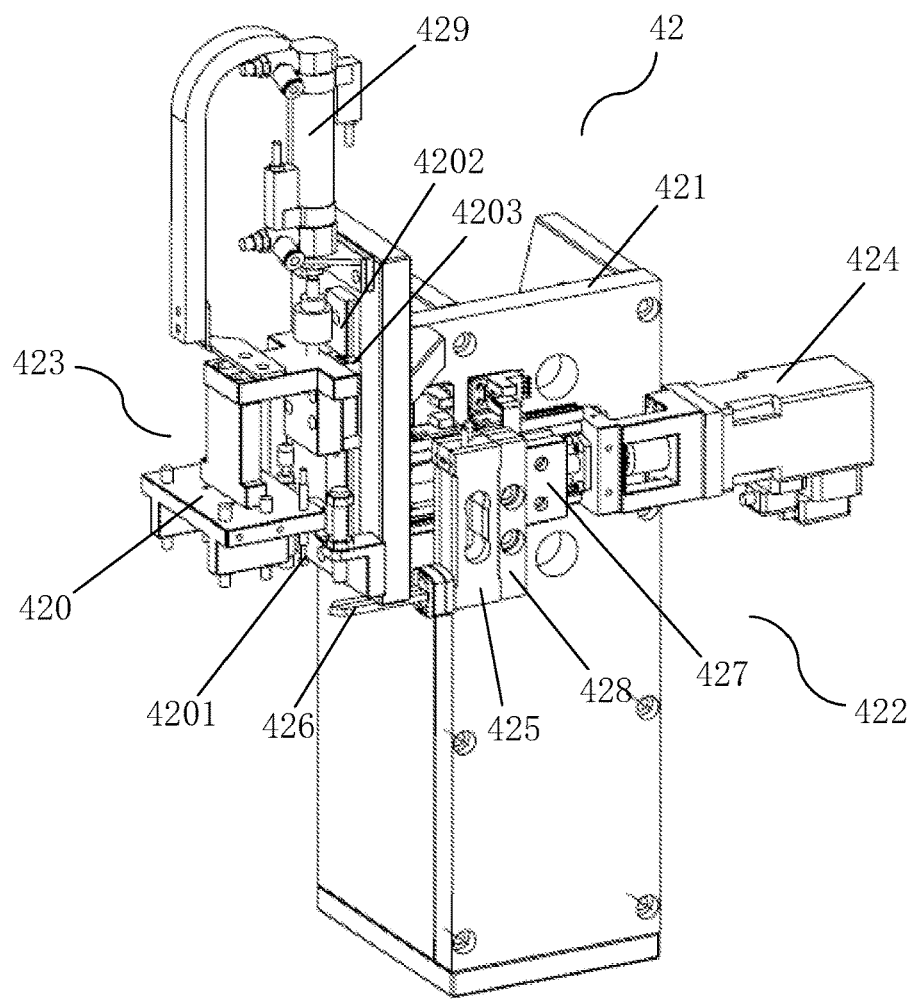
FIG. 5 is a schematic structure diagram of a transverse detection mechanism in the embodiment of the intelligent test device for a substrate according to the present invention.
Figure 6:
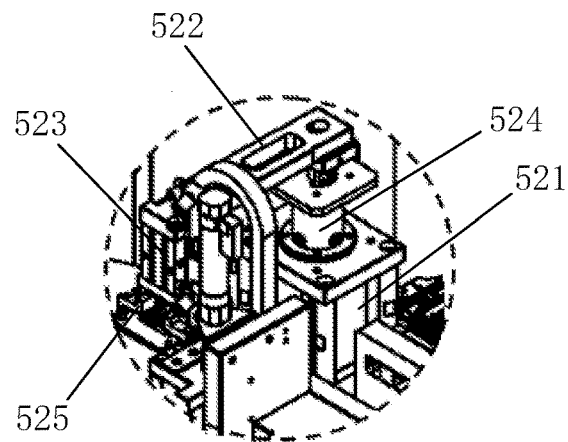
FIG. 6 is an enlarged schematic structure diagram of portion A of FIG. 2.

As shown in FIG. 1 to FIG. 6:

an intelligent test device for a substrate in an embodiment of the present invention includes a main case 1, a detection turntable 2, a feeding mechanism 3, a contact detection mechanism for testing the OFF-pressure of contacts from spring pieces, a discharging mechanism 5 and an electric control box 6, the detection turntable 2, the feeding mechanism 3, the contact detection mechanism and the discharging mechanism 5 being all ON-connected to the electric control box 6.

The detection turntable 2 is arranged on a workbench 11 within the main case 1 in a rotatable manner, with a driving motor 21 provided on the bottom thereof and a number of grippers 22 provided on the disk thereof; and the driving motor 21 is connected to a rotating shaft of the detection turntable 2 by means of driving, and ON-connected to the electric control box 6.

The feeding mechanism 3 includes a feeding conveyor belt 31 and a loading manipulator 32 for carrying the substrate to be tested at a discharging end of the feeding conveyor belt 31 to a loading station gripper 22 of the detection turntable 2; the feeding conveyor belt 31 is arranged outside the main case 1, and the discharging end thereof extends into the main case 1; and the loading manipulator 32 is arranged on the workbench 11 within the main case 1, and located on an outer side of a loading station of the detection turntable 2. The loading manipulator 32 includes a U-shaped base frame 321, a first cylinder 322, a second cylinder 323, a third cylinder 324, a fourth cylinder 325, a third linear slide rail 326 and a third slider 327; the U-shaped base frame 321 is mounted on the workbench 11 within the main case 1, and the discharging end of the feeding conveyor belt 31 is located within a U-shaped opening of the U-shaped base frame 321; the first cylinder 322 and the third linear slide rail 326 are horizontally arranged on the top of the U-shaped base frame 321 in parallel to each other, the third slider 327 is clamped onto the third linear slide rail 326 in such a way of being capable of moving left and right, and the third slider 327 has a longitudinal mounting plate 328 provided thereon; the second cylinder 323 is vertically downward mounted on the longitudinal mounting plate 328, the third cylinder 324 is vertically downward mounted on the longitudinal mounting plate 328 in such a way of being capable of moving up and down (specifically, the loading manipulator 32 further includes a fourth linear slide rail 329 and a fourth slider 320, the fourth linear slide rail 329 is vertically downward arranged on the longitudinal mounting plate 328, and the fourth slider 320 is clamped onto the fourth linear slide rail 329 in such a way of being capable of moving up and down and has the third cylinder 324 arranged thereon), and is connected to the driving shaft of the second cylinder 323; the fourth cylinder 325 is vertically downward mounted on a slider of the third cylinder 324 and moves forth and back along with the slider, and the driving shaft thereof has a first gripper jaw 3251 provided thereon; and the first cylinder 322, the second cylinder 323, the third cylinder 324 and the fourth cylinder 325 are all ON-connected to the electric control box 6.

The contact detection mechanism is arranged on the workbench 11 within the main case 1, and located outside the detection station of the detection turntable 2. The specific structure of the contact detection mechanism may be as follows: the contact detection mechanism includes a longitudinal detection mechanism 41 and/or a transverse detection mechanism 42; the longitudinal detection mechanism 41 mainly consists of a first base frame 411, a first test assembly 412 and a first product positioning assembly 413; the first base frame 411 is mounted on the workbench 11 within the main case 1; the first test assembly 412 includes a first ball screw 414, a first pressure sensor 415 and a first pressure thimble 416, the first ball screw 414 is mounted on the first base frame 411 perpendicularly to the detection turntable 2, a first sensor holder 418 extending to be above a longitudinal detection station of the detection turntable 2 is provided on a driving slider 417 thereof, and the first pressure sensor 415 is mounted on the first sensor holder 418; the first pressure thimble 416 is vertically downward arranged on the first pressure sensor 415 and located right above the longitudinal detection station, and moves up and down under the drive of the first ball screw 414; the first product positioning assembly 413 includes a first driving cylinder 419 and a first product holding jaw 410, the first driving cylinder 419 is mounted on the first base frame 411 perpendicularly to the detection turntable 2, the first product holding jaw 410 is mounted on the first base frame 411 in such a way of being capable of moving up and down (specifically, the first product positioning assembly 413 further includes a first linear slide rail 4102 and a first slider 4103; the first linear slide rail 4102 is vertically downward mounted on the first base frame 411, the first slider 4103 is clamped onto the first linear slide rail 4102 in such a way of being capable of moving up and down, and the first product holding jaw 410 is mounted on the first slider 4103), and is connected to the driving shaft of the first driving cylinder 419, and a first test probe 4101 for powering the substrate to be tested fixed by the first base frame 411 is provided on the first base frame 411; during the test, the first pressure thimble 416 passes through the first product holding jaw 410 and then acts on the substrate to be tested fixed within the first product holding jaw 410, so that the longitudinally ON-connected contacts of the substrate to be tested are separated and powered off. The transverse detection mechanism 42 mainly consists of a second base frame 421, a second test assembly 422 and a second product positioning assembly 423; the second base frame 421 is mounted on the workbench 11 within the main case 1; the second test assembly 422 includes a second ball screw 424, a second pressure sensor 425 and a second pressure thimble 426, the second ball screw 424 is horizontally mounted on the second base frame 421 and extends to be above the transverse detection station of the detection turntable 2, a second sensor holder 428 is provided on a driving slider 427 thereof, and the second pressure sensor 425 is mounted on the second sensor holder 428; the second pressure thimble 426 is horizontally mounted on the second pressure sensor 425 and located right above the transverse detection station, and moves forth and back under the drive of the second ball screw 424; the second product positioning assembly 423 is located in front of the second detection assembly 422 and comprises a second driving cylinder 429 and a second product holding jaw 420, the second driving cylinder 429 is mounted on the second base frame 421 perpendicularly to the detection turntable 2, the second product holding jaw 420 is mounted on the second base frame 421 in such a way of being capable of moving up and down (specifically, the second product positioning assembly 423 further includes a second linear slide rail 4202 and a second slider 4203; the second linear slide rail 4202 is vertically downward arranged on the second base frame 421, the second slider 4203 is clamped onto the second linear slide rail 4202 in such a way of being capable of moving up and down, and the second product holding jaw 420 is mounted on the first slider 4203), and is connected to the driving shaft of the second driving cylinder 429, and a second test probe 4201 for powering the substrate to be tested fixed by the second base frame 421 is provided on the second base frame 421; during the test, the second pressure thimble 426 extends into the second product holding jaw 420 under the drive of the second ball screw 424 and then acts on the substrate to be tested fixed within the second product holding jaw 420, so that the transversely ON-connected contacts of the substrate to be tested are separated and powered off. Furthermore, the first ball screw 414, the first pressure sensor 415, the first driving cylinder 419, the first product holding jaw 410, the first test probe 4101, the second ball screw 424, the second pressure sensor 425, the second driving cylinder 429, the second product holding jaw 420 and the second test probe 4201 are all ON-connected to the electric control box 6.

The discharging mechanism 5 includes a discharging conveyor belt 51 and an unloading manipulator 52 for carrying the tested substrate on an unloading station gripper 22 of the detection turntable 2 to a feeding end of the discharging conveyor belt 31; the discharging conveyor belt 51 is arranged outside the main case 1, and the feeding end thereof extends into the main case 1; and the unloading manipulator 52 is arranged on the workbench 11 within the main case 1, and located on an outer side of an unloading station of the detection turntable 2. The unloading manipulator 52 includes a rotary motor 521, a rotating arm 522 and a fifth cylinder 523; the rotary motor 521 is mounted on the workbench 11 within the main case 1, with a rotating shaft 524 thereof vertically facing upward; one end of the rotating arm 522 is mounted on the rotating shaft 524, the other end thereof has the fifth cylinder 523 arranged thereon, and the driving shaft of the fifth cylinder 523 vertically faces downward and has a second gripper jaw 525 provided thereon; and both the rotary motor 521 and the fifth cylinder 523 are ON-connected to the electric control box 6.

During the operation of the intelligent test device for a substrate of the present invention, the loading manipulator 32 carries a substrate to be tested at the discharging end of the feeding conveyor belt 31 to the loading station gripper 22 of the detection turntable 2 first, and then the rotating detection turntable 2 conveys the substrate to be tested to the detection station, the contact detection mechanism 4 performs the pressure detection on the substrate on the detection station. Specifically: the first step: the first product positioning assembly 413 of the longitudinal detection mechanism 41 positions the substrate to be tested on the longitudinal detection station by the first product holding jaw 410 and powers the substrate to be tested by the first test probe 4101 thereon, at this moment, the substrate to be tested is powered on; next, the first pressure thimble 416 of the first test assembly 412 passes through the first product holding jaw 410 and then acts on the substrate to be tested fixed within the first product holding jaw 410, so that the longitudinally ON-connected contacts of the substrate to be tested are separated and powered off; at this moment, the first pressure sensor 415 transfers the pressure value at the moment of power-off to the electric control box 6, and finally it is judged whether the OFF-pressure of the longitudinal contacts of the substrate meets the requirements according to the pressure value, and the substrate to be tested is conveyed to the transverse detection station by the detection turntable 2; the second step: the second product positioning assembly 423 of the transverse detection mechanism 42 positions the substrate to be tested by the second product holding jaw 420 and powers the substrate to be tested by the second test probe 4201 thereon, at this moment, the substrate to be tested is powered on; next, the second pressure thimble 426 of the second test assembly 422 passes through the second product holding jaw 420 and then acts on the substrate to be tested fixed within the second product holding jaw 420, so that the transverse ON-connected contacts of the substrate to be tested are separated and powered off; and at this moment, the second pressure sensor 425 transfers the pressure value at the moment of power-off to the electric control box 6, and finally it is judged whether the OFF-pressure of the transverse contacts of the substrate meets the requirements according to the pressure value, and the substrate to be tested is conveyed to the unloading station by the detection turntable 2. And finally, the unloading manipulator 52 carries the tested substrate on the unloading station gripper 22 of the detection turntable 2 to the feeding end of the discharging conveyor belt 31 and outputs the tested substrate.

In this way, the test device of the present invention can complete the OFF-pressure detection of the longitudinal and transverse contacts of the substrate automatically without requiring any manual operation, thus the test device of the present invention is easy to use, and the detection accuracy and the detection efficiency are significantly improved. Furthermore, the ex-factory pass rate of products is guaranteed, the cost and the production cost are efficiently reduced, and the market competitiveness of products is further enhanced thus to obtain business success.

As a preferred solution of the present invention, an automatic sorting mechanism 7 for defective products is provided on the discharging conveyor belt 51. The automatic sorting mechanism 7 for defective products includes more than one push-out cylinder 71 and more than one sorting box 72; the push-out cylinder 71 and the sorting box 72 are arranged, opposite to each other, in a left side and a right side of the discharging conveyor belt 51 (For example, the push-out cylinder 71 and the sorting box 72 are respectively arranged on the left side and the right side of the discharging conveyor belt 51 side by side, and arranged opposite to each other one to one; and the automatic sorting mechanism 7 for defective products may include a sorting box for defective F1 contact pressure, a sorting box for defective F2 contact pressure, a sorting box for defective F3 contact pressure and a sorting box for defective F2–F1 contact pressure); and the push-out cylinder 71 is ON-connected to the electric control box 6, and extends by the driving shaft thereof into the discharging conveyor belt 51 under the control of the electric control box 6 for pushing the defective products into the sorting box 72. In this way, the intelligent test device for a substrate of the present invention can classify and sort the defective products automatically, the rework sorting process is thus omitted and the rework workload is reduced. Consequently, the rework is easier, and the cost is lower.

Additionally, a position sensor 73 is provided on a side, closer to the loading end of the discharging conveyor belt 51, of each push-out cylinder 71, and the position sensor 73 may be an ultrasonic sensor or an infrared sensor and is ON-connected to the electric control box 6. In this way, the position of a corresponding defective product may be accurately detected by the position sensor 73, so that the electric control 6 controls a corresponding push-out cylinder 71 to push the defective product into the sorting box 72. The accuracy of sorting is thus further improved.

What described above is a preferred implementation of the present invention, it should be noted that, for a person of ordinary skill in the art, various improvements and modifications may be made without departing from the principle of the present invention, and those improvements and modifications shall also be regarded as falling into the protection scope of the present invention.

What is claimed is:

1. An intelligent test device for a substrate, comprising: a main case (1), a detection turntable (2), a feeding mechanism (3), a contact detection mechanism for testing the OFF-pressure of contacts from spring pieces, a discharging mechanism (5) and an electric control box (6), the detection turntable (2), the feeding mechanism (3), the contact detection mechanism and the discharging mechanism (5) being all ON-connected to the electric control box (6); wherein, the detection turntable (2) is arranged on a workbench (11) within the main case (1) in a rotatable manner, with a driving motor (21) provided on the bottom thereof and a number of grippers (22) provided on the disk thereof; and the driving motor (21) is connected to a rotating shaft of the detection turntable (2) by means of driving, and ON-connected to the electric control box (6);

the feeding mechanism (3) comprises a feeding conveyor belt (31) and a loading manipulator (32) for carrying the substrate to be tested at a discharging end of the feeding conveyor belt (31) to a loading station gripper (22) of the detection turntable (2); the feeding conveyor belt (31) is arranged outside the main case (1), and the discharging end thereof extends into the main case (1); and the loading manipulator (32) is arranged on the workbench (11) within the main case (1), and located on an outer side of a loading station of the detection turntable (2);

the contact detection mechanism is arranged on the workbench (11) within the main case (1), and located on the outer side of a detection station of the detection turntable (2); and the discharging mechanism (5) comprises a discharging conveyor belt (51) and an unloading manipulator (52) for carrying the tested substrate on an unloading station gripper (22) of the detection turntable (2) to a feeding end of the discharging conveyor belt (31); the discharging conveyor belt (51) is arranged outside the main case (1), and the feeding end thereof extends into the main case (1); and the unloading manipulator (52) is arranged on the workbench (11) within the main case (1), and located on an outer side of an unloading station of the detection turntable (2);

wherein the contact detection mechanism comprises a longitudinal detection mechanism (41) and/or a transverse detection mechanism (42);

the longitudinal detection mechanism (41) mainly consists of a first base frame (411), a first test assembly (412) and a first product positioning assembly (413), wherein the first base frame (411) is mounted on the workbench (11) within the main case (1); the first test assembly (412) comprises a first ball screw (414), a first pressure sensor (415) and a first pressure thimble (416), the first ball screw (414) is mounted on the first base frame (411) perpendicularly to the detection turntable (2), a first sensor holder (418) extending to be above a longitudinal detection station of the detection turntable (2) is provided on a driving slider (417) thereof, and the first pressure sensor (415) is mounted on the first sensor holder (418); the first pressure thimble (416) is vertically downward arranged on the first pressure sensor (415) and located right above the longitudinal detection station, and moves up and down under the drive of the first ball screw (414); the first product positioning assembly (413) comprises a first driving cylinder (419) and a first product holding jaw (410), the first driving cylinder (419) is mounted on the first base frame (411) perpendicularly to the detection turntable (2), the first product holding jaw (410) is mounted on the first base frame (411) in such a way of being capable of moving up and down and is connected to the driving shaft of the first driving cylinder (419), and a first test probe (4101) for powering the substrate to be tested fixed by the first base frame (411) is provided on the first base frame (411); during the test, the first pressure thimble (416) passes through the first product holding jaw (410) and then acts on the substrate to be tested fixed within the first product holding jaw (410), so that the longitudinally ON-connected contacts of the substrate to be tested are separated and powered off;

the transverse detection mechanism (42) mainly consists of a second base frame (421), a second test assembly (422) and a second product positioning assembly (423), wherein the second base frame (421) is mounted on the workbench (11) within the main case (1); the second test assembly (422) comprises a second ball screw (424), a second pressure sensor (425) and a second pressure thimble (426), the second ball screw (424) is horizontally mounted on the second base frame (421) and extends to be above the transverse detection station of the detection turntable (2), a second sensor holder (428) is provided on a driving slider (427) thereof, and the second pressure sensor (425) is mounted on the second sensor holder (428); the second pressure thimble (426) is horizontally mounted on the second pressure sensor (425) and located right above the transverse detection station, and moves forth and back under the drive of the second ball screw (424); the second product positioning assembly (423) is located in front of the second detection assembly (422) and comprises a second driving cylinder (429) and a second product holding jaw (420), the second driving cylinder (429) is mounted on the second base frame (421) perpendicularly to the detection turntable (2), the second product holding jaw (420) is mounted on the second base frame (421) in such a way of being capable of moving up and down, and is connected to the driving shaft of the second driving cylinder (429), and a second test probe (4201) for powering the substrate to be tested fixed by the second base frame (421) is provided on the second base frame (421); during the test, the second pressure thimble (426) extends into the second product holding jaw (420) under the drive of the second ball screw (424) and then acts on the substrate to be tested fixed within the second product holding jaw (420), so that the transversely ON-connected contacts of the substrate to be tested are separated and powered off; and the first ball screw (414), the first pressure sensor (415), the first driving cylinder (419), the first product holding jaw (410), the first test probe (4101), the second ball screw (424), the second pressure sensor (425), the second driving cylinder (429), the second product holding jaw (420) and the second test probe (4201) are all ON-connected to the electric control box (6).

2. The intelligent test device for a substrate according to claim 1, wherein the first product positioning assembly (413) further comprises a first linear slide rail (4102) and a first slider (4103), and the second product positioning assembly (423) further comprises a second linear slide rail (4202) and a second slider (4203); the first linear slide rail (4102) is vertically downward mounted on the first base frame (411), the first slider (4103) is clamped onto the first linear slide rail (4102) in such a way of being capable of moving up and down, and the first product holding jaw (410) is mounted on the first slider (4103); and the second linear slide rail (4202) is vertically downward arranged on the second base frame (421), the second slider (4203) is clamped onto the second linear slide rail (4202) in such a way of being capable of moving up and down, and the second product holding jaw (420) is mounted on the first slider (4103).

3. The intelligent test device for a substrate according to claim 1, wherein the loading manipulator (32) comprises a U-shaped base frame (321), a first cylinder (322), a second cylinder (323), a third cylinder (324), a fourth cylinder (325), a third linear slide rail (326) and a third slider (327); the U-shaped base frame (321) is mounted on the workbench (11) within the main case (1), and the discharging end of the feeding conveyor belt (31) is located within a U-shaped opening of the U-shaped base frame (321); the first cylinder (322) and the third linear slide rail (326) are horizontally arranged on the top of the U-shaped base frame (321) in parallel to each other, the third slider (327) is clamped onto the third linear slide rail (326) in such a way of being capable of moving left and right, and the third slider (327) has a longitudinal mounting plate (328) provided thereon; the second cylinder (323) is vertically downward mounted on the longitudinal mounting plate (328), the third cylinder (324) is vertically downward mounted on the longitudinal mounting plate (328) in such a way of being capable of moving up and down, and is connected to the driving shaft of the second cylinder (323); the fourth cylinder (325) is vertically downward mounted on a slider of the third cylinder (324) and moves forth and back along with the slider, and the driving shaft thereof has a first gripper jaw (3251) provided thereon; and the first cylinder (322), the second cylinder (323), the third cylinder (324) and the fourth cylinder (325) are all ON-connected to the electric control box (6).

4. The intelligent test device for a substrate according to claim 3, wherein the loading manipulator (32) further comprises a fourth linear slide rail (329) and a fourth slider (320), the fourth linear slide rail (329) is vertically downward arranged on the longitudinal mounting plate (328), and the fourth slider (320) is clamped onto the fourth linear slide rail (329) in such a way of being capable of moving up and down and has the third cylinder (324) arranged thereon.

5. The intelligent test device for a substrate according to claim 4, wherein the unloading manipulator (52) comprises a rotary motor (521), a rotating arm (522) and a fifth cylinder (523); the rotary motor (521) is mounted on the workbench (11) within the main case (1), with a rotating shaft (524) thereof vertically facing upward; one end of the rotating arm (522) is mounted on the rotating shaft (524), the other end thereof has the fifth cylinder (523) arranged thereon, and the driving shaft of the fifth cylinder (523) vertically faces downward and has a second gripper jaw (525) provided thereon; and both the rotary motor (521) and the fifth cylinder (523) are ON-connected to the electric control box (6).

6. The intelligent test device for a substrate according to claim 1, wherein an automatic sorting mechanism (7) for defective products is provided on the discharging conveyor belt (51), and the automatic sorting mechanism (7) for defective products comprises more than one push-out cylinder (71) and more than one sorting box (72); the push-out cylinder (71) and the sorting box (72) are arranged, opposite to each other, in a left side and a right side of the discharging conveyor belt (51); and the push-out cylinder (71) is ON-connected to the electric control box (6), and extends by the driving shaft thereof into the discharging conveyor belt (51) under the control of the electric control box (6) for pushing the defective products into the sorting box (72).

7. The intelligent test device for a substrate according to claim 6, wherein the push-out cylinder (71) and the sorting box (72) are respectively arranged on the left side and the right side of the discharging conveyor belt (51) side by side, and arranged opposite to each other one to one.

8. The intelligent test device for a substrate according to claim 7, wherein a position sensor (73) is provided on a side, closer to the loading end of the discharging conveyor belt (51), of the push-out cylinder (71), and the position sensor (73) is ON-connected to the electric control box (6).

9. The intelligent test device for a substrate according to claim 8, wherein the position sensor (73) is an ultrasonic sensor or an infrared sensor.

\* \* \* \* \*